D. HALLOCK.
Weighing-Scales.
No. 213,898. Patented April 1, 1879.
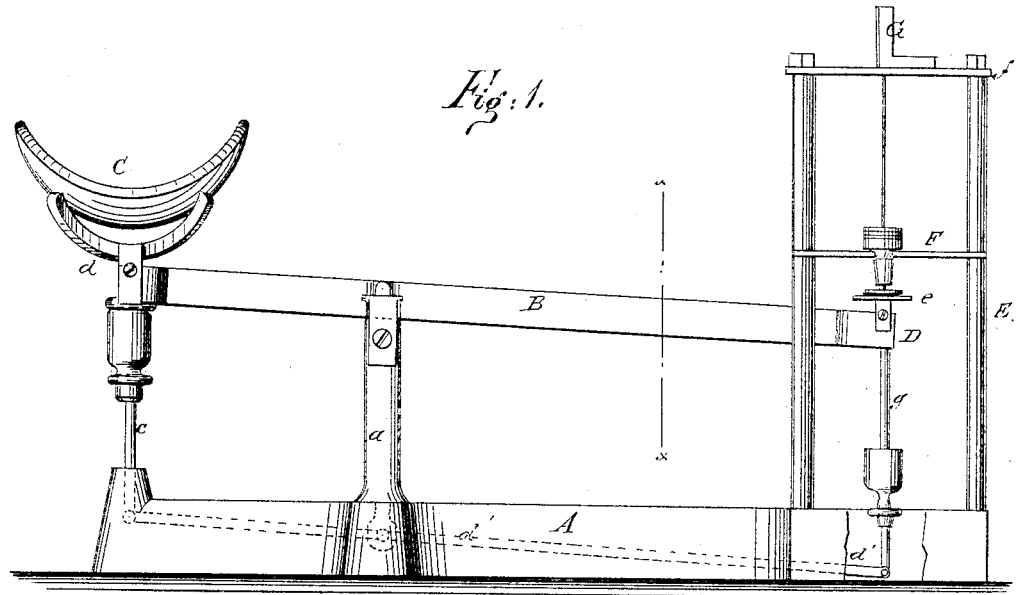
Fig. 1.
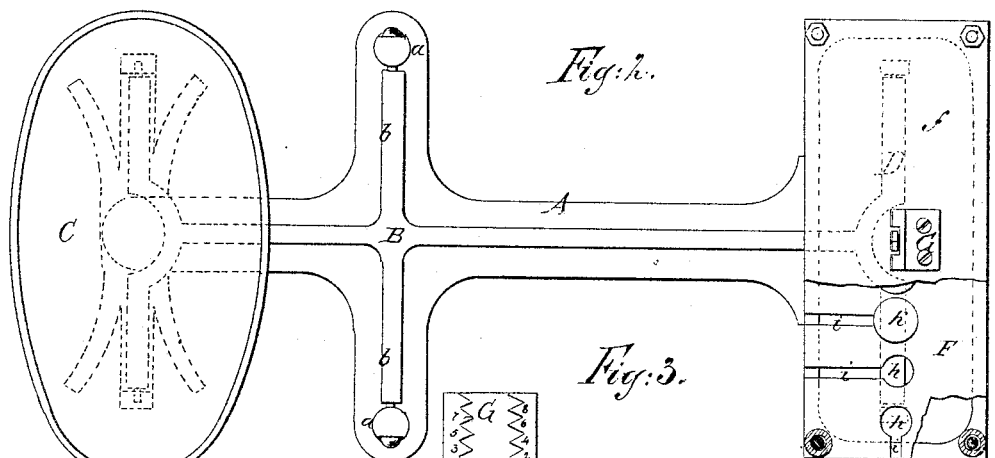
Fig. 2.
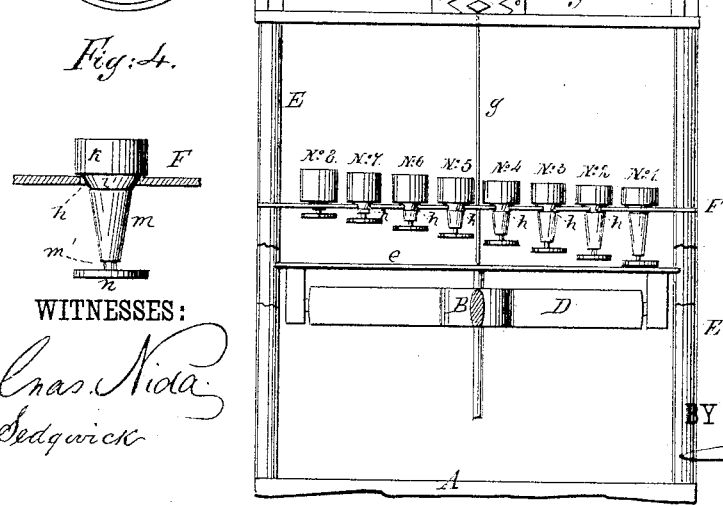
Fig. 3.
Fig. 4.
WITNESSES:
Chas. Nida
C. Sedgwick
INVENTOR:
D. Hallock
BY Munn & Co.
ATTORNEYS.
N. PETERS, PHOTO-LITHOGRAPHER, WASHINGTON, D. C.

UNITED STATES PATENT OFFICE.

DAVID HALLOCK, OF COXSACKIE, NEW YORK.

IMPROVEMENT IN WEIGHING-SCALES.

Specification forming part of Letters Patent No. 213,898, dated April 1, 1879; application filed October 25, 1878.

*To all whom it may concern:*

Be it known that I, DAVID HALLOCK, of Coxsackie, in the county of Greene and State of New York, have invented a new and Improved Scale, of which the following is a specification:

This invention relates specifically to improvements in the weights and their arrangements for balancing and weighing the articles placed in the scoop.

It consists in suspending the weights so that as the material is put in the scoop the opposite end of the beam is raised, lifting successively the weights from their seats until a sufficient number is lifted to obtain the desired weight of material placed in the scoop, and indicate accurately the weight thereof.

In the accompanying drawings, Figure 1 is a side elevation of a scale provided with my improvements. Fig. 2 is a top view or plan of the same. Fig. 3 is a section of the scale through line $x\ x$ of Fig. 1, with my improved arrangement of weights in elevation; and Fig. 4 represents one of the weights with its peculiarities of construction clearly brought out.

Similar letters of reference indicate corresponding parts.

Referring to the drawings, the base of the scale is designated by the letter A. From this base rise two standards, $a\ a$, to which the arms $b\ b$ of the beam B are pivoted. The short end of the beam is pivoted to the rod $c$, having on its upper end, above the beam, a frame, $d$, for receiving the scoop C, while its lower end is pivoted to the end of the guiding-bar $d'$ in the base A, pivoted immediately under the beam B, and in a vertical line with the arms $b\ b$. The opposite end of the beam B is provided with a T-head, D, to the upper edge of which is secured horizontally the plate $e$.

A quadrangular frame, E, rises from this end of the base A, having at its top a cap-plate, $f$, which forms the housing of the head D. In this frame, at a suitable point between the cap-plate and the head of the beam, is secured horizontally the plate F.

A rod, $g$, is pivoted at its lower extremity to the end of the bar $d'$, under frame E. This rod passes up through the plate $e$, (to which it is fixed,) thence through a hole in plate F, thence through another hole in the cap-plate, and at its extremity is provided with an index, which moves in a groove in the graduated dial or plate G fixed to the cap-plate. This rod moves freely up and down, in obedience to the movement of the beam B.

In the plate F a succession of holes, $h\ h\ h$, &c., is made, which connect with slots $i\ i\ i$, &c., leading to the edge of the plate, as clearly indicated in Fig. 2. These holes are to receive the weights, which are entered therein through the slots, as will be described presently.

The weight used in connection with this scale is shown in detail in Fig. 4. It consists of head $k$, larger in diameter than the holes $h$ in the plate, so that it will sit on the plate, as shown. Below this is a conical shoulder, $l$, the greater diameter of which is about equal to that of the hole. From this extends a tapering shank, $m$, on the end whereof is a neck, $m'$, terminating in a large disk, $n$. These weights are all made of the same general shape, and weigh precisely the same, but between the head and disk are of different lengths, the amount of metal taken from the shank being placed in the head, and vice versa.

In making a set of weights for a scale, the length from the head to the disk is decreased from the longest to the shortest on a regular scale of reduction, for a purpose that will presently be referred to.

To place the weights in the plate the neck $m'$ must be inserted in the slot $i$, the end of the shank bearing on the plate, and the weight pushed up the slot until it enters the hole at the end thereof, when it is allowed to drop down. The conical shoulder $l$ strikes the edges of the hole and guides the weight, so that when lifted and released it will always seat itself squarely in the same position on the plate, so that the centers of all will be and remain in the same line, and they cannot get out of the holes, because the shanks are larger than the slots.

The weights are placed in the plate in the following order: The set having been made with a regular decrease in the length between the head and disk, the weight with the largest shank, No. 1, is placed in the plate at the first hole—say, on the right, as in Fig. 3; No. 2, the next longest, in the second hole; No. 3, the next in length, in the third hole, and so on until the full set is placed on the plate, when it will be observed that between the bottom of the disk No. 1 to the bottom of disk No. 2, and from No. 2 to No. 3, and so on, there is a regular interval of space, so that from No. 1 to No. 8 there are eight regular steps or gradations.

In adjusting the scale the beam must be balanced so that the plate $e$ will be just short of actual contact with the under side of the disk of weight No. 1, so that it will always be in a situation to indicate the weight of anything put in the scoop.

The operation of my improvement is as follows: Assuming the weights 1 2 3, &c., to be ounces, of which there are eight altogether, the scale is thus adapted to weigh one-half ($\frac{1}{2}$) pound. If an ounce of anything is required it is placed in the scoop until the beam turns, and the plate $e$, lifting the ounce-weight No. 1 from its seat, the index indicates precisely on the graduated plate G when the proper amount is obtained, and when it reaches the ounce-mark the plate $e$ is nearly in contact with the bottom of the disk of weight No. 2, but does not bear against it, and it is thus in position to lift the second ounce if it is required. In this way any desired quantity within the capacity of the scale is weighed, the plate $e$ lifting just as many weights as there are ounces required.

There is no necessity for all the weights of the set being of the same denomination; but it is essential that the steps or gradations between them should be regular, so that the plate $e$ will only have to travel the same distance in order to indicate the weight on the graduated plate.

A scale made in this way obviates the necessity and inconvenience of placing the weights on and removing them from the beam. It occupies less space, is perfectly accurate, as there is nothing about it to get out of order, and the weights are always in place.

Any kind of an indicator can be used with the rod $g$. It can be connected with the pinion of a hand moving on a semicircular or circular dial, if desired.

The construction of my improved scale may be modified, first, by making the weights equal in length, and suspending them in the manner described, and then, to get the desired operation, making the plate $e$ in steps or gradations of the same rise, so as to lift the weights successively; secondly, the weights may be set in a suitable receptacle below plate $e$, and provided with bails looped over links suspended from plate $e$, said links being graduated in length, so that they will lift the weights when the beam turns successively and at equal intervals.

Either of these modifications may be adopted without going beyond the scope of my invention.

Having thus fully described my invention, I claim as new and desire to secure by Letters Patent—

1. As an improvement in scales, the plate F, supported in frame E, and provided with holes $h$ and slots $i$ to adapt it to receive the weights, in combination with the beam B, provided with the plate $e$, for lifting the weights, substantially as described.

2. As an improvement in scales, the weights 1 2 3, &c., arranged upon the plate F in regular order and gradation, in combination with plate F, having holes $h$ and slots $i$, and beam B, provided with plate $e$, for lifting the said weights, substantially as described.

3. As an improvement in scales, the weight composed of the head $k$, conical shoulder $l$, tapering shank $m$, neck $m'$, and disk $n$, to adapt it to be secured in the plate F in position to be acted upon by the plate $e$ when the beam is turned, substantially as described.

4. As an improvement in scales, the combination and arrangement of beam B, provided with plate $e$, the plate F, adapted to receive the weights 1 2 3 4 5 6 7 8 arranged upon the plate in a regular order and gradation, the rod $g$, provided with an index on its upper end, and the graduated plate G, substantially as described.

DAVID HALLOCK.

Witnesses:
WARREN L. REYNOLDS,
HENRY G. BEDELL.